United States Patent Office 3,232,995
Patented Feb. 1, 1966

3,232,995
DIHYDROXY NITROSTILBENES
Warren E. Solodar, Newton Center, Mass., assignor to Polaroid Corporation, Cambridge, Mass., a corporation of Delaware
No Drawing. Filed May 25, 1964, Ser. No. 370,041
4 Claims. (Cl. 260—619)

This invention relates to chemistry and more particularly to a novel chemical synthesis.

A principal object of the present invention is to provide a novel method for preparing aminoaralkyl-diacetoxy-substituted benzenes.

Another object is to provide an improved synthesis whereby the aforementioned compounds may be prepared simply and efficiently.

One object of the invention is to provide novel chemical compounds.

Other objects of the invention will in part be obvious and will in part appear hereinafter.

This invention accordingly comprises the process involving the several steps and the relation and order of one or more of such steps with respect to each other, and the product possessing the features, properties and the relation of components which are exemplified in the following detailed disclosure, and the scope of the application of which will be indicated in the claims.

For a fuller understanding of the nature and objects of the invention, reference should be had to the following detailed description.

Aminoaralkyl-diacetoxy-substituted benzenes have heretofore been found to be useful as intermediates in preparing both dye developers (dyes which are also silver halide developing agents and which are employed in color photography) and silver halide developing agents. The preparation of p-(2,5-diacetoxy-phenethyl)-aniline hydrochloride is disclosed, for example, in U.S. Patent No. 3,019,254, issued to Milton Green et al. on January 30, 1962.

The present invention is directed to a novel synthesis whereby certain members of the aforementioned class of compounds may be obtained simply and quickly.

It has now been discovered that the compounds with which this invention is concerned may be prepared by a three-step process comprising the steps of: (1) reacting a dialkoxy compound of the formula:

(A) 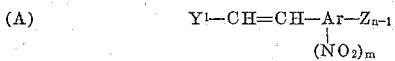

wherein Ar is an aryl nucleus such as a benzene or naphthalene nucleus; $m$ is a positive integer from 1 to 2, inclusive; each Z is an alkyl group, preferably a lower alkyl group of not more than five carbons, such as methyl or ethyl, or a halogen, such as chlorine; $n$ is a positive integer from 1 to 5, inclusive; $Y^1$ is a para-dialkoxy- or an ortho-dialkoxy phenyl group, which group may also be substituted by alkyl (preferably lower alkyl, such as ethyl, methyl, etc.) or halogen (such as chlorine or bromine) groups; at least one of said —$NO_2$ groups being in one of the ortho and/or para positions with respect to the —CH=CH— group, with an amine hydrohalide dealkylating agent, such as methylamine hydrohalide, dimethylamine hydrohalide, trimethylamine hydrohalide, ethylamine hydrohalide, ethanolamine hydrohalide, pyridine hydrohalide, quinoline hydrohalide, diphenylamine hydrohalide, aniline hydrochloride, aniline hydrobromide and aniline hydrofluoride, in combination with the heretofore-mentioned dealkylating agents the passage of dry hydrogen chloride gas through the reaction mixture facilitates the reaction in the temperature range of 180–200° C. (for a general discussion in the use of aliphatic, aromatic and heterocyclic amine hydrohalides as dealkylating agents, see "The Cleavage of Ethers" by Robert L. Buswell, Jr., Chemical Reviews, volume 54, 1954, particularly pages 635–636), to form a compound of the formula:

(B) 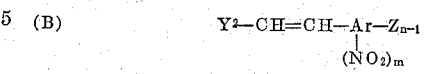

wherein $Y^2$ is a para-dihydroxy or an ortho-dihydroxy phenyl group, which group may also be substituted by alkyl or halogen groups; (2) reacting the resultant product with an acyl halide, preferably acetyl chloride, or a benzoyl halide, preferably benzoyl chloride, and an acid, such as concentrated $H_2SO_4$, to form a compound of the formula:

(C) 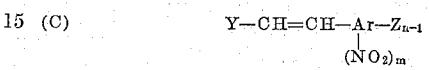

wherein Y is a para-diacyloxy or an ortho-diacyloxy phenyl group, which group may also be substituted by alkyl or halogen groups; and (3) reducing the resultant product by well-known hydrogenation procedures to form a compound of the formula:

(D) 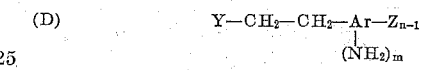

wherein Y has the same meaning as heretofore mentioned in Formula C.

It will be appreciated that in Formulae B, C and D, Ar, Z, $m$ and $n$ have the meanings heretofore noted.

By the term "alkoxy" is meant the grouping RO—, wherein R is an aliphatic group, preferably containing one to five carbons. In the preferred embodiment, R contains one carbon, and the alkoxy group is a methoxy group.

Accordingly, by the term "acyloxy" is meant the grouping $R^1$—COO—, wherein $R^1$ is an aliphatic group, preferably containing one to five carbons, i.e., the acyloxy group is an acetoxy group, or $R^1$ may be an aryl or aralkyl group, e.g., benzoyl group; hence, the acyloxy group would then be a benzoxy group.

It will be noted that $m$ could be a positive integer greater than 2. This invention, however, is concerned with those compounds where $m$ is a positive integer from 1 to 2, inclusive, since if $m$ is 3 a trinitro compound is formed which may be dangerous due to its inherent explosive properties.

Other dealkylating agents such as halogen acids, e.g., HBr and HCl; aluminum halides, e.g., aluminum chloride; and boron trihalides, e.g., boron tribromide, have failed to produce the desired chemical compounds by dealkylation of the respective alkoxy groups of Formula A; use of such agents has led to undesirable or unidentifiable products such as addition products formed with the ethenylene (—CH=CH—) group, undesirable polymer formations, etc.

Quite surprisingly, particularly in view of the failure of the above-mentioned dealkylating agents to produce the desired chemical compounds within the scoping of Formula B, amine hydrohalides exemplified by pyridine hydrochloride did produce the desired compounds. In addition, the passage of dry hydrogen chloride gas through the reaction mixture has been found to facilitate the reaction when the dealkylating agent is pyridine hydrochloride. That is, under these conditions only a small amount of pyridine hydrochloride need be used, thereby rendering the synthesis more economical than simply using pyridine hydrochloride per se.

The compounds of Formula A where $m$ is 1, are known in the art and per se comprise no part of the present invention. Their preparation is described, for example, in U.S. Patent No. 3,019,107, issued to Elkan R. Blout et al. on January 30, 1962, and in a continuation-in-part thereof, Serial No. 98,287, filed March 27, 1961.

While the preferred acyl halide is acetyl chloride, other acyl halides may be employed, e.g., benzoyl chloride, propionyl chloride, trichloroacetyl chloride, etc.

Water should be kept to a minimum due to its adverse effects on the process, i.e., slowing down the reaction rate and giving an incomplete reaction. When water is mixed with acetyl chloride the resulting products are acetic acid and hydrochloric acid thus taking away the needed acyl halide to carry out step (2).

The addition of an acid, such as concentrated sulfuric acid, in step (2) is merely to provide a catalyst. Suitable acids will be apparent to those skilled in the chemical art.

Suitable hydrogenation catalysts useful in the practice of the invention are well known in the art and per se comprise no part of the present invention. As examples of useful catalysts, mention may be made of palladium-on-charcoal, palladium-on-barium sulfate, Raney nickel, etc.

The present invention will be more readily understood by the following equations and description illustrating the preparation of p-(2,5-diacetoxy-phenethyl)-aniline hydrochloride.

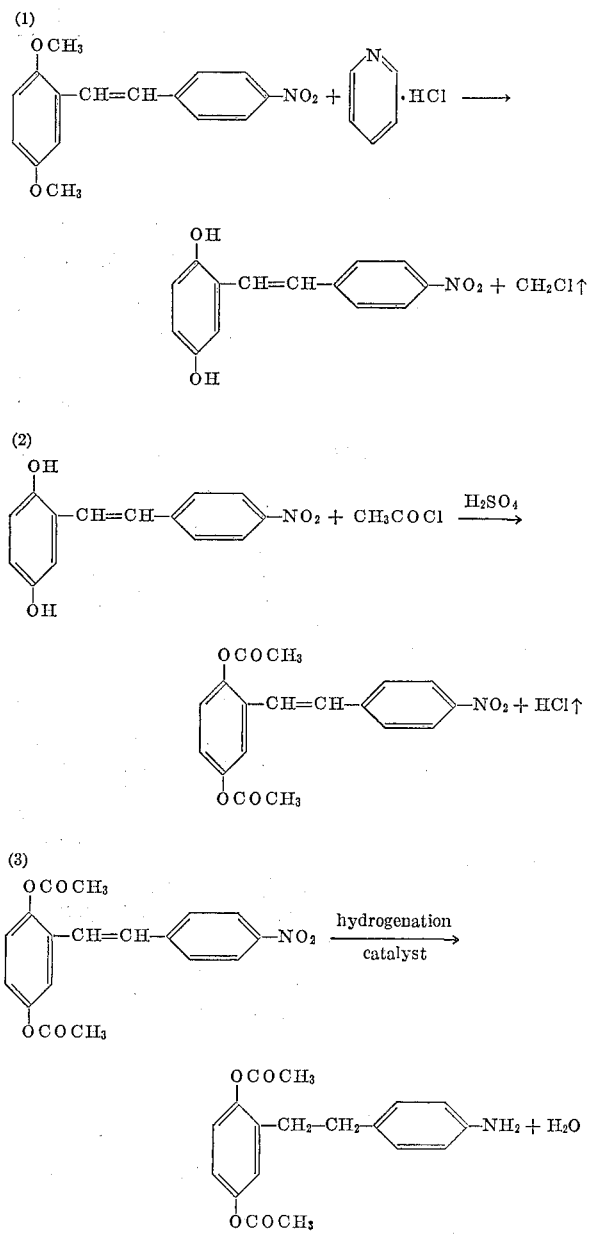

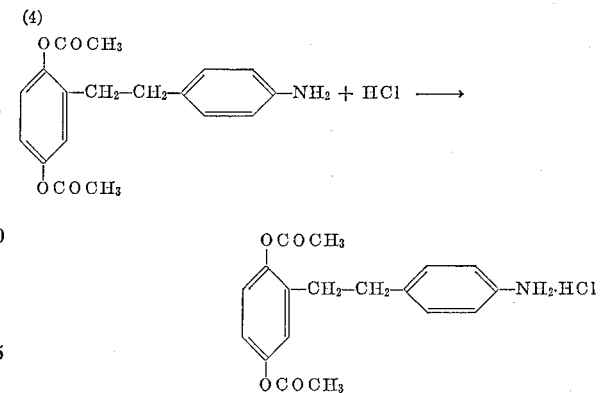

In the preferred embodiment, it has been found to be advantageous not to isolate the free base formed in step (3). In other words, in the preferred embodiment, the reaction mixture from the hydrogenation step (3) is subjected to step (4), whereby the addition of an acid, e.g., hydrochloric acid, permits formation of the more stable acid addition salt of the desired material.

Furthermore, if the aminoaralkyl-diacetoxy-substituted benzenes are to be stored for any length of time, it is preferable to keep them in the form of the salt, e.g., to prevent shifting of an acyl group from a hydroxy group to the amino group.

It will be appreciated that the product of step (3) may be isolated and immediately employed in processes, e.g., for preparing silver halide developing agents by hydrolysis of the acyloxy groups.

As the ester derivative formed in step (2) is a solid, the hydrogenation step (3) is preferably performed in the presence of a suitable organic solvent. Suitable inert organic solvents will be readily suggested to those skilled in the art. As examples of such solvents, mention may be made of acids like acetic acid or esters thereof, e.g., ethyl acetate, propyl acetate, etc. or alcohols such as ethanol, methanol, etc.

The particular reaction conditions not specifically described, e.g., temperature, pressure, etc., are not critical in the practice of this invention and will be readily apparent to those skilled in the art.

The present invention is directed to a novel synthesis which yields purer products than the processes heretofore employed for preparing the desired chemical compounds. In other words, in the prior art synthesis when a dihydroxy compound had to be esterified in the presence of an amine group, the amine frequently would preferentially react to form the amide, which amide could not be hydrolyzed without also hydrolyzing the esterified hydroxy groups. Use in the acylation step, as the reaction medium, of the HCl-saturated anhydrous acid corresponding to the acyl halide of the desired acyloxy group minimized this undesired amide reaction.

In addition, when utilizing the prior art process there is a problem of getting rid of reactive by-products which continue to react with the product, causing chemical deterioration during storage. Thus, for example, excess acetyl chloride frequently remains with the diacetyl product, and is difficult to readily remove. This problem is completely eliminated by the present synthesis, thus making it possible to obtain an essentially pure product.

It will be apparent in the aforementioned specific examples that the demethylation step is fast, requires minimal handling and does not require large volumes and large reactors as did the prior synthesis.

The compounds of Formula B, i.e., the intermediate products formed in step (1), e.g., 2,5-dihydroxy-4'-nitro-stilbene, are novel compounds and may be easily isolated. These novel intermediates may also be used as silver halide developing agents.

As examples of novel compounds within the scope of Formula B, mention may be made of the following:

(B-1) 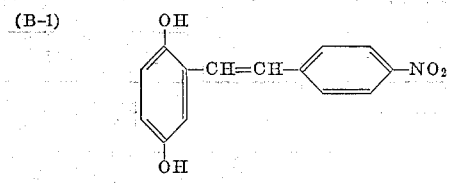
2,5-dihydroxy-4'-nitrostilbene (B-2) 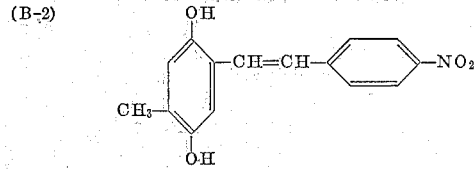
2,5-dihydroxy-4-methyl-4'-nitrostilbene (B-3) 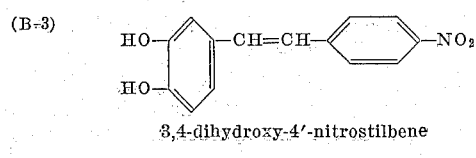
3,4-dihydroxy-4'-nitrostilbene (B-4) 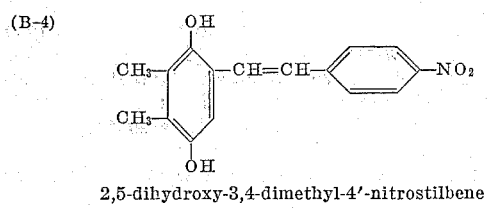
2,5-dihydroxy-3,4-dimethyl-4'-nitrostilbene (B-5) 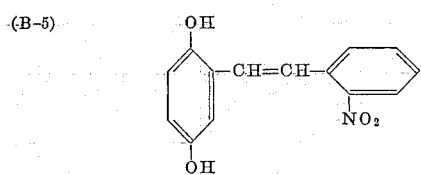
2,5-dihydroxy-2'-nitrostilbene (B-6) 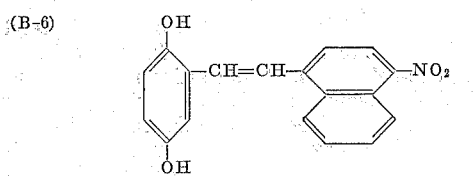
4-(2',5'-dihydroxy-phenethenylene)-1-nitronaphthalene (B-7) 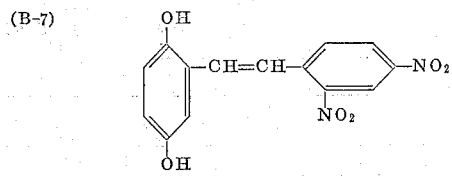
2,5-dihydroxy-2',4'-dinitrostilbene (B-8) 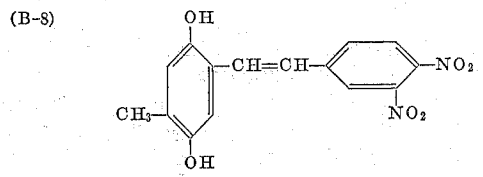
2,5-dihydroxy-4-methyl-3',4'-dinitrostilbene (B-9) 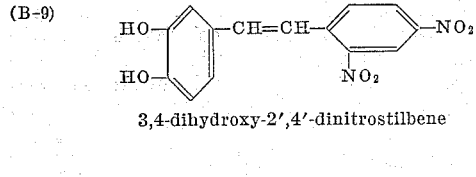
3,4-dihydroxy-2',4'-dinitrostilbene (B-10) 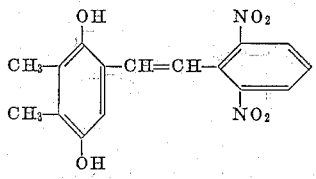
2,5-dihydroxy-3,4-dimethyl-2',6'-dinitrostilbene (B-11) 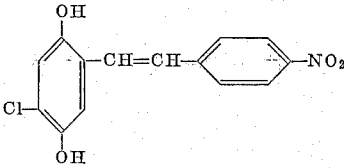
4-chloro-2,5-dihydroxy-4'-nitrostilbene (B-12) 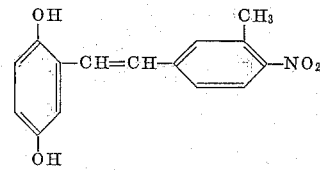
2,5-dihydroxy-3'-methyl-4'-nitrostilbene It will be noted that the compounds of Formula C, i.e., the intermediate products formed in acylation step (2), e.g., 2,5-diacetoxy-4'-nitrostilbene, also are novel compounds and may be easily isolated. These compounds are described and claimed in the copending application of Myron S. Simon, Serial No. 370,066, filed concurrently.

As examples of the novel compounds within the scope of Formula C, mention may be made of the following:

(C-1) 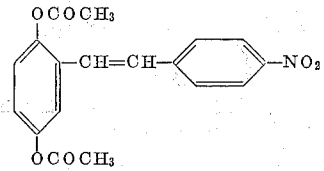
2,5-diacetoxy-4'-nitrostilbene (C-2) 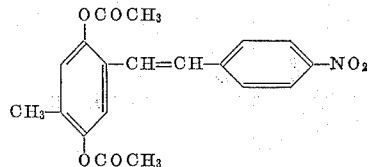
2,5-diacetoxy-4-methyl-4'-nitrostilbene (C-3) 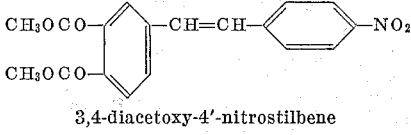
3,4-diacetoxy-4'-nitrostilbene (C-4) 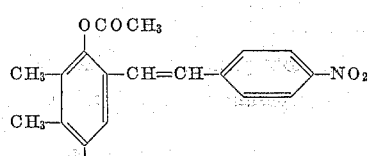
2,5-diacetoxy-3,4-dimethyl-4'-nitrostilbene (C-5) 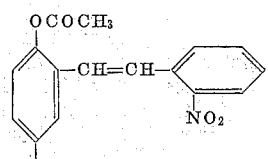
2,5-diacetoxy-2'-nitrostilbene

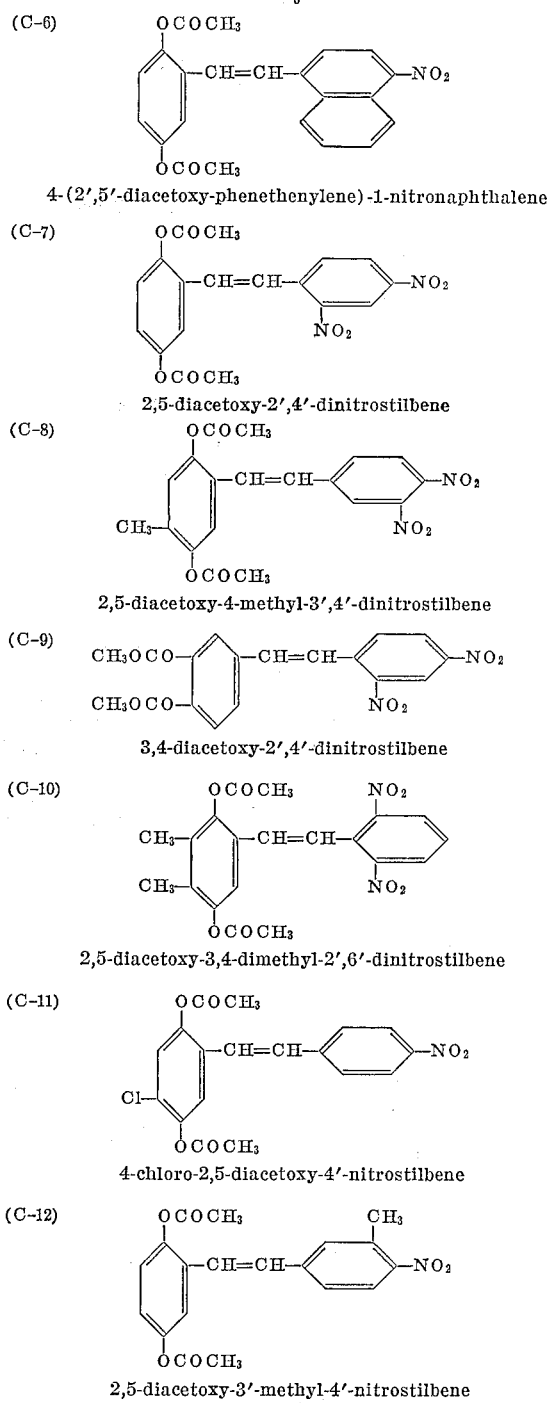

(C-6) 4-(2',5'-diacetoxy-phenethenylene)-1-nitronaphthalene (C-7) 2,5-diacetoxy-2',4'-dinitrostilbene (C-8) 2,5-diacetoxy-4-methyl-3',4'-dinitrostilbene (C-9) 3,4-diacetoxy-2',4'-dinitrostilbene (C-10) 2,5-diacetoxy-3,4-dimethyl-2',6'-dinitrostilbene (C-11) 4-chloro-2,5-diacetoxy-4'-nitrostilbene (C-12) 2,5-diacetoxy-3'-methyl-4'-nitrostilbene The examples which follow are submitted to illustrate and not to limit this invention.

I. p-(2,5-diacetoxy-phenethyl)-aniline hydrochloride.

*Example 1.—Preparation of 2,5-dimethoxy-4'-nitrostilbene*

A mixture of 24.5 gm. of p-nitrophenyl acetic acid (0.135 M), 18.0 gm. of 2,5-dimethoxy benzaldehyde (0.108 M), and 6 ml. of piperidine was refluxed with stirring at 130° C. for 3.5 hours. The piperidine was distilled off and the temperature was raised to 160° C. for 3 hours. The mixture, on cooling, was diluted with 25 ml. of acetic acid, and then poured into 125 ml. of water. A dark red oil separated. The supernatant liquid was decanted and the residual oil solidified on treatment with 25 ml. of ethanol. The solid was filtered off and recrystallized from 300 ml. of ethanol, to give 11.5 gm. of yellow needles which melted at 115–116° C. A recrystallized sample melted at 116.5–117° C., and gave the following analysis:

|  | C | H | N |
|---|---|---|---|
| Calculated | 67.4 | 5.3 | 4.9 |
| Found | 67.4 | 5.5 | 4.9 |

It will be appreciated that other useful compounds within the scope of Formulae A and B where m is 1, e.g. 2,5-dimethoxy-4-methyl-4'-nitrostilbene, 3,4-dimethoxy-4'-nitrostilbene, 2,5 - dimethoxy-3,4-dimethyl-4'-nitrostilbene, etc., may be prepared utilizing the procedure set forth in Example 1, i.e., by substituting the appropriate reactants and proper amounts of each reactant, e.g., 2,5-dimethoxy-4-methyl benzaldehyde would replace 2,5-dimethoxy benzaldehyde to form 2,5-dimethoxy-4-methyl-4'-nitrostilbene, followed by dealkylation.

*Example 2.—Preparation of 2,5-dihydroxy-4'-nitrostilbene*

A mixture of 8.55 gm. (0.03 M) of 2,5-dimethoxy-4'-nitrostilbene (prepared as described in Example 1) and approximately 40 gm. of pyridine hydrochloride was heated at bath temperature of 205–212° C. for half an hour. The reaction mixture was allowed to cool slightly, then was poured into water. A tan precipitate separated and was filtered off, washed with water, and desiccated in vacuum over $P_2O_5$. The resulting dried crude product was recrystallized from 125 ml. of anisole, after filtering off some insoluble tar, to yield 4.5 gm. of yellow crystals which melted at 231–235° C., and which analyzed as follows:

|  | C | H | N |
|---|---|---|---|
| Calculated | 65.4 | 4.3 | 5.4 |
| Found | 65.2 | 4.3 | 5.3 |

*Example 3.—Preparation of 2,5-diacetoxy-4'-nitrostilbene*

A mixture of 4.0 gm. of 2,5-dihydroxy-4'-nitrostilbene (prepared as described in Example 2), 40 ml. of acetyl chloride and 4 drops of concentrated $H_2SO_4$ was refluxed for one and one-half hours. The starting material went into solution with evolution of HCl. During the latter part of this reaction, a bright yellow solid separated. Excess acetyl chloride was evaporated in vacuum. The residue was treated with water, filtered and desiccated in vacuum over KOH. The resulting dried crude product was recrystallized from 350 ml. of n-propyl alcohol to yield 3 gm. of bright yellow fibrous crystals which melted at 192–194° C., and which gave the following analysis:

|  | C | H | N |
|---|---|---|---|
| Calculated | 63.3 | 4.4 | 4.1 |
| Found | 63.1 | 4.4 | 4.1 |

*Example 4.—Preparation of p-(2,5-diacetoxy-phenethyl)-aniline hydrochloride*

An incomplete solution of 3.1 gm. (0.0091 M) of 2,5-diacetoxy-4'-nitrostilbene (prepared as described in Example 3) in 150 ml. of ethyl acetate containing 3 gm. of 10% Pd/BaSO$_4$ was hydrogenated in a Parr shaker. Hydrogen uptake was complete in three minutes. The catalyst was filtered off, and 0.78 ml. of concentrated HCl (0.0095 M) was added to the clear, colorless filtrate. On seeding and scratching, a fibrous white precipitate separated. This precipitate was filtered off, washed with ethyl acetate, then ether and air-dried to yield 2.8 gm.

of the desired product which melted at 154–158° C., and gave the following analysis:

|  | C | H | N |
|---|---|---|---|
| Calculated | 61.8 | 5.8 | 4.0 |
| Found | 62.0 | 5.9 | 3.6 |

II. 2',4'-diaminophenethyl-2,5-diacetoxy-benzene hydrochloride.

*Example 5.—Preparation of 2,5-dimethoxy-2',4'-dinitrostilbene*

To a warm (50° C.) mixture of 30.0 gm. of 2,5-dimethoxy benzaldehyde (0.18 M), 40.8 gm. of 2,4-dinitrophenyl acetic acid (0.18 M) and 200 ml. of ethanol, 24 ml. of piperidine was slowly added while stirring. Some cooling was necessary as the piperidine was added to the reaction mixture. Gas and heat were evolved from the deepening yellow reaction mixture. The resulting mixture was refluxed with stirring on the steambath for 2 hours. A precipitate formed after refluxing for 15 minutes. The mixture, on cooling, was filtered and the precipitate was washed with ethanol and then desiccated in vacuum over $P_2O_5$, to yield 36.0 gm. (60.5% yield) of orange needles which melted at 171–173° C., and which gave the following analysis:

|  | C | H | N |
|---|---|---|---|
| Calculated | 58.2 | 4.3 | 8.5 |
| Found | 58.0 | 4.3 | 8.5 |

It will be appreciated that other useful compounds within the scope of Formulae A and B where $m$ is 2, e.g., 2,5-dimethoxy-4-methyl-3',4'-dinitrostilbene, 3,4-dimethoxy-2',4'-dinitrostilbene, 2,5-dimethoxy-3,4-dimethyl-2',6'-dinitrostilbene, etc., may be prepared utilizing the procedure set forth in Example 5, by selecting the appropriate reactants and proper amounts of each reactant, e.g., 2,5-dimethoxy-4-methyl benzaldehyde would replace 2,5-dimethoxy benzaldehyde and 3,4-dinitrophenyl acetic acid would replace 2,4-dinitrophenyl acetic acid to form 2,5-dimethoxy-4-methyl-3',4'-dinitrostilbene, followed by dealkylation.

*Example 6.—Preparation of 2,5-dihydroxy-2',4'-dinitrostilbene*

A mixture of 6.0 gm. of 2,5-dimethoxy-2',4'-dinitrostilbene (prepared as described in Example 5) and 20 gm. of pyridine hydrochloride was refluxed under nitrogen with stirring for half an hour at bath temperature of 220° C. The hot reaction mixture was poured into 200 ml. of warm dilute HCl and a gummy light-brown precipitate formed which soon solidified. The brown solid that separated was filtered off, washed with water and desiccated in vacuum over $P_2O_5$, to yield 5.5 gm. of rust colored solid which melted at 205–220° C. The resulting dried crude product was recrystallized from 150 ml. of o-dichlorobenzene to yield 1.85 gm. of orange crystals which melted at 248–251° C., and gave the following analysis:

|  | C | H | N |
|---|---|---|---|
| Calculated | 55.6 | 3.3 | 9.2 |
| Found | 55.6 | 3.2 | 9.1 |

*Example 7.—Preparation of 2,5-diacetoxy-2',4'-dinitrostilbene*

A mixture of 4.0 gm. of 2,5-dihydroxy-2'4', dinitrostilbene (prepared as described in Example 6), 40 ml. of acetyl chloride and 4 drops of concentrated $H_2SO_4$ was refluxed for ¾ hour. The starting material went into solution with evolution of HCl. The resulting mixture was cautiously poured into 250 ml. of ice water. A yellow precipitate formed which was then filtered, washed with water and desiccated in vacuum over KOH, to yield 3.3 gm. of yellow solid which melted at 172–190° C. The resulting crude product was recrystallized from 40 ml. of acetic acid to yield 1.6 gm. of yellow needles which melted at 194–197° C., and gave the following analysis:

|  | C | H | N |
|---|---|---|---|
| Calculated | 56.0 | 3.6 | 7.2 |
| Found | 55.7 | 3.7 | 7.2 |

*Example 8.—Preparation of 2',4'-diaminophenethyl-2,5-diacetoxy-benzene hydrochloride*

A mixture of 2.05 gm. of 2,5-diacetoxy-2',4'-dinitrostilbene (prepared as described in Example 7) in 100 ml. of methyl Cellosolve containing 1.0 gm. of 10% $Pd/BaSO_4$ was hydrogenated in a Parr shaker. Hydrogen uptake was complete in 10 minutes. The catalyst was filtered off, and 1.0 ml. of concentrated HCl was added to the pale yellow filtrate. The filtrate was then diluted with 400 ml. of dry ether. There was a slow separation of oil, which soon solidified. The resulting solid was filtered and then desiccated in vacuum over $P_2O_5$ and KOH, to yield 1.6 gm. of white solid which melted at 180–188° C., and gave the following analysis:

|  | C | H | N | Cl |
|---|---|---|---|---|
| Calculated | 54.0 | 5.5 | 7.0 | 17.7 |
| Found | 53.8 | 5.4 | 6.6 | 16.9 |

As previously mentioned, the diacetoxy compounds of Formula D are highly useful chemical intermediates. They are especially useful in reactions wherein it is desired that reaction be restricted to the amino group, and also where it is desired that the hydroxyl groups be protected during a reaction involving the amino groups(s) and yet be readily regenerated after the reaction is completed.

In particular, the compounds of Formula D are highly useful as intermediates in the preparation of azo compounds, as for example, in the preparation of azo compounds as disclosed and claimed in the copending application of Elkan R. Blout, Milton Green and Howard G. Rogers, Serial No. 145,978, filed October 18, 1961, now U.S. Patent 3,134,764, issued May 26, 1964 as a continuation-in-part of and replacement for Serial No. 612,045, filed September 25, 1956, now abandoned.

It will be appreciated that when $m$ is 2, one of the amine groups on the diacetoxy compounds of this invention may be separately diazotized and coupled to form various desired dye developers. Both amino groups in compounds of Formula D wherein $m$ is 2 may be diazotized and the resulting diazonium compound biscoupled, e.g., to form:

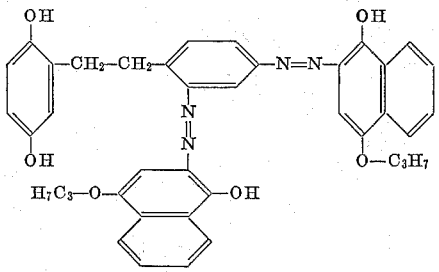

Since certain changes may be made in the above process and product without departing from the scope of the invention herein involved, it is intended that all matter contained in the above description shall be interpreted as illustrative and not in a limiting sense.

What is claimed is:
1. A compound of the formula:

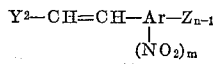

wherein Ar is an aryl nucleus selected from the class consisting of benzene and naphthalene nuclei; $m$ is an integer from 1 to 2, inclusive; each Z is selected from the group consisting of halogen and alkyl groups; $n$ is an integer from 1 to 5, inclusive; and $Y^2$ is selected from the group consisting of para-dihydroxy-phenyl, ortho-dihydroxy-phenyl and alkyl and halogen substituted derivatives thereof; at least one of said —$NO_2$ groups being in one of the ortho and para positions with respect to —CH=CH—.

2. A compound as defined in claim 1 wherein Ar is a benzene nucleus.
3. 2,5-dihydroxy-4'-nitrostilbene.
4. 2,5-dihydroxy-2',4'-dinitrostilbene.

References Cited by the Examiner
UNITED STATES PATENTS 2,419,516  4/1947  Bloom et al. _____ 260—619
3,061,434  10/1962  Green et al.

OTHER REFERENCES

Brownlee et al., Biochem. Jour., 37:572–577 (1943).
Burwell, Chem. Reviews, 54:635–636 (1954).

LEON ZITVER, *Primary Examiner.*
HAROLD G. MOORE, *Examiner.*